Dec. 19, 1939.  L. O. SORDAHL  2,184,169
RADIATION PYROMETER DEVICE
Filed Dec. 29, 1938
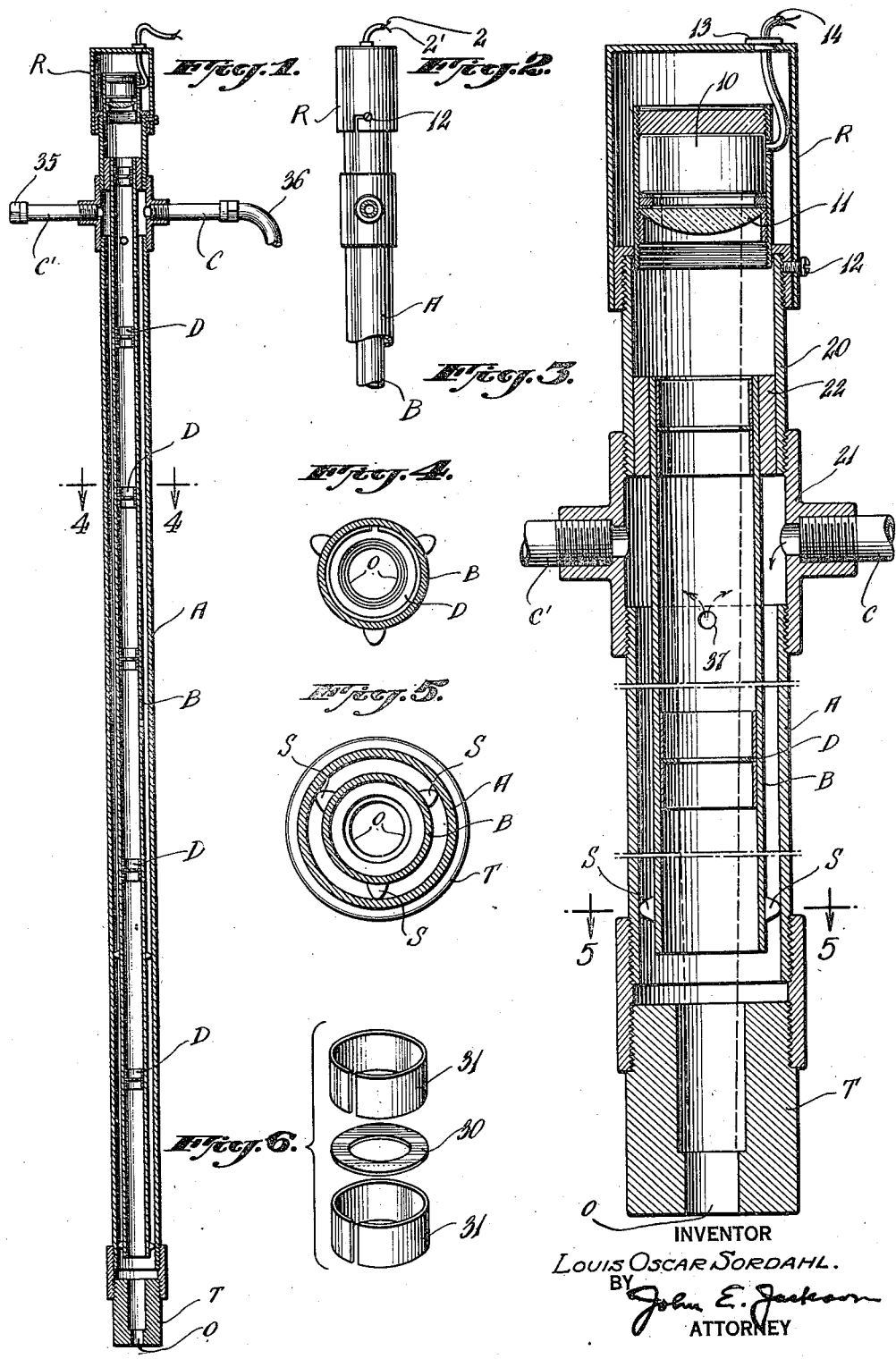
INVENTOR
LOUIS OSCAR SORDAHL.
BY
John E. Jackson
ATTORNEY Patented Dec. 19, 1939

2,184,169

UNITED STATES PATENT OFFICE 2,184,169

RADIATION PYROMETER DEVICE

Louis Oscar Sordahl, Chicago, Ill., assignor to United States Steel Corporation, a corporation of New Jersey Application December 29, 1938, Serial No. 248,343

4 Claims. (Cl. 73—355)

This invention relates to pyrometer devices and more particularly to a radiation pyrometer device adapted to measure the temperature of molten metal baths and has for its object the provision of an improved device for use in the measurement of the temperature of molten metal baths. Another object is to facilitate the obtaining of an automatic record of the temperature of molten metal baths. Other objects and advantages will be apparent.

Heretofore in the art it has been proposed to obtain the temperature of a molten metal bath by means of a radiation sensitive device located in one end of a tubular structure through immersing the open end of the tube in the molten metal, utilizing the energy generated in the radiation sensitive device to form a visual or permanent record of the temperature of the bath, as indicated in Collins et al. Patent No. 2,020,092, issued November 5, 1935.

I have found that the pyrometer device of the type disclosed by this Collins et al. patent is defective and is incapable of producing an accurate temperature reading for the reason that no means is provided to restrict the radiation falling upon the radiation sensitive device to the radiation emanating from the molten metal. In accordance with the present invention, this means is provided. Moreover, the device is structurally weak, and, as a consequence, inaccurate and misleading temperature measurements are obtained.

Before further disclosure of the present invention reference should be made to the accompanying drawing, wherein:

Fig. 1 is sectional view illustrating the device of the present invention; Fig. 2 is an enlarged view of the same; Fig. 3 is a side elevational view of the top end of the device; Fig. 4 is a section along plane 4—4 of Fig. 1; Fig. 5 is a section along plane 5—5 of Fig. 2; and Fig. 6 is a perspective view illustrating one feature of the present invention.

Referring to the drawing (Fig. 1), the improved pyrometer device of the present invention comprises an elongated tube A, preferably comprised of metal such as iron or steel, a radiation sensitive means R closing one end of the tube, a tip means T provided with an opening O closing the opposite end of the tube, concentrically sustained inner tube B, also preferably comprised of metal, to conduct radiation passing through opening O of tip T to radiation sensitive means R, diaphragms D along the length of the tube B to restrict radiation passing to radiation sensitive means R along tube B to that radiation traveling in a substantially straight line path from orifice O, and means C to supply a pressure of air to the area between tubes A and B to effectively maintain tube B at a lower temperature than tube A and to prevent the inflow of molten metal through opening O in tip T when the tip in service use is immersed in a molten metal bath.

The details of construction preferred for the device of the present invention may be noted from Fig. 2. Radiation sensitive means R comprises a radiation sensitive device 10 which is common to the art and a lense 11 for concentrating radiation traversing tube B thereon, the said device 10 and lense 11 being detachably secured in the end of tube A transversely to the tube axis in any convenient manner, substantially as indicated, the entire assembly being covered by the detachable cap means identified by letter R, the detachability of cap R being obtained by slot and screw arrangement 12. Means such as indicated at 13 for permitting terminals 14 of radiation device 10 to pass through cap R is provided. The entire arrangement indicated for radiation sensitive device R may be widely varied without essential departure from the present invention.

The means for centrally sustaining tube B within tube A may also be widely varied without departure from the present invention. The preferred construction is illustrated in Fig. 3, and comprises a tubular member 20 forming substantially an extension of tube A when threaded onto coupling 21 threadedly engaging the end of tube A. The upper end of tube B is sustained in desired axial position relative to tube A within tubular member 20 by means of spacer member 22. Preferably the tube B is sustained by wedge contact of spacer member 22, substantially as indicated, to facilitate the removal of tube B and its replacement when desired. The arrangement shown provides for the sealing of the outer surface of tube B to the inner surface of tube A at the upper end thereby limiting radiation passing to radiation sensitive device to that passing through tube B.

As shown in the drawing, tube B extends to adjacent the bottom of tube A and the bottom end of tube B is maintained in desired spaced relation to tube A by spacer means S.

Diaphragm means D to define a light tunnel of determined cross-sectional area and to limit radiation traversing tube tube B to that passing in a substantially straight line path comprises a washer 30 and split spring members 31—31 located on opposite sides of washer 30 as indicated in perspective in Fig. 6. By this arrangement the plurality of diaphragm means D may be located in any desired spaced relation within tube B and the orifice diameter of the washer 30 may be varied as may be desired.

Means C to supply a pressure of air to the interior of tube A in the area between tubes A and B may be widely varied without departure from the present invention. In the arrangement provided, I have arranged for the means C to also function as a handle for workmen utilizing the device. As indicated in the drawing, coupling member 21 is provided with threaded openings into which tubes C—C' are threaded, the length of the tubes C—C' being sufficient to provide handles. The end of tube C' is closed as by cap 35, and the open end of tube C is connected as by flexible tubing 36 to a source of air under pressure.

In order to provide means to permit a portion of the air to pass into tube B so as to prevent particles of dust from entering tube B through the bottom open end, orifice 37 is provided adjacent the upper end of tube B. The upper end of tube B being closed the air entering tube B through orifice 37 passes downwardly and out through the open end of tube B and thence out through orifice O in tip T.

Tip T is provided for the dual purpose of limiting the extent to which the molten metal enters tube A and the area of radiating surface exposed to radiation sensitive device R. The restricted opening O operates to increase the pressure of the air passing therethrough thereby permitting the use of lower air pressures with consequent lessening in boiling and in the oxidation of the metal by the passage of the air therethrough. The tip T is preferably made of heavy stock as indicated to obtain increased life of the tip and to obtain greater stability in the operation of the device, the heavy stock heating more slowly and more uniformly when in contact with the molten metal. The manner of attachment of tip T to the end of tube A may be varied widely without departure from the present invention.

From the above description and the drawing it is believed apparent that many modifications and departures may be made from the specific embodiment illustrated in the drawing without essentially departing from the nature and scope of the present invention to obtain the full advantages of the present invention.

The essential advantage gained by the present invention is a uniformity and accuracy of temperature determination results not obtainable by prior art devices. The central tube B operates in addition to the function hereinabove described, as reinforcement for tube A and prevents undue warping and bending of tube A at the high temperatures to which it is subjected during service use. The cooling effect of the air circulating between the two tubes A and B maintains tube B at a temperature at which it will not readily bend or sag thereby preventing tube A from warping or sagging to such a degree as will interfere with the transmission of radiation to the radiation sensitive means R along the radiation tunnel provided by tube B.

In view of the above description, all modifications and departures from the specific embodiment illustrated are contemplated as may fall within the scope of the following claims.

What I claim is:

1. In a radiation pyrometer device consisting of a tubular member, a radiation sensitive device closing one end of the tubular member and means to supply air under pressure within the tubular member adjacent the said closed end, a second tubular member, means to sustain said second tubular member centrally within and in spaced relation to the first said tubular member, means to seal the outer surface of the said second tubular member to the inner surface of said first tubular member at a point between the closed end of the first tubular member and the point of air entry, a plurality of spaced diaphragm members disposed along the interior of the second tubular member defining a radiation tunnel of desired cross-sectional area, means to permit a portion of the air under pressure to enter said second tubular member adjacent the sealed end thereof, and a closure member for the open end of said first tubular member, said closure member being provided with an opening of restricted diameter in alignment with the center axis of said first tubular member and the center axis of said diaphragm members in the second tubular member defining said radiation tunnel.

2. In a radiation pyrometer device comprising a tubular member having an open end and a closed end, a radiation sensitive device located in said closed end in a position to be energized by radiation traversing said tube, and means to supply air under pressure within the tube adjacent the said closed end, means defining a radiation tunnel limiting the radiation falling on said radiation sensitive device to radiation traversing a substantially straight line path through the tube, said means comprising a second tubular member, means to sustain said second tubular member concentrically within and in spaced relation to the first tubular member, said means sealing the two said tubular members together at a point between the closed end and the point of air entry, a plurality of diaphragm members disposed within said second tubular member in determined and desired spaced relation defining a radiation tunnel of restricted cross-sectional area, and a closure member for the open end of said first tubular member, an opening in said closure member, said opening having a diameter approximating the diameter of said radiation tunnel and being located in substantial axial alignment with said radiation tunnel.

3. A radiation pyrometer device comprising in combination two tubular members, means to sustain one tubular member centrally within and in spaced relation to the other tubular member with the outer surface of the inner tubular member sealed to the inner surface of the outer tubular member adjacent one end, a radiation sensitive device, means to sustain said radiation sensitive device in closure position on the sealed ends of said tubular members in a position to be energized by radiation traversing the length of the inner tubular member, means to supply a pressure of air to the space between said tubular members adjacent the sealed ends, means to permit a portion of the air to enter the inner tubular member adjacent the sealed end thereof, a closure member for the open end of the outer tubular member, an opening in said closure member, the axis of said opening coinciding with the axis of the inner tubular member, and a plurality of diaphragm members disposed in spaced relation within the inner tubular member defining a radiation tunnel of determined cross-section leading to said radiation sensitive device.

4. A radiation pyrometer device comprising in combination two tubular members, one sustained concentrically within and spaced from the other, means adjacent one end sealing the space gap between said tubular members, a radiation sensitive device, means to sustain said radiation sensitive device in closure position on the open end of the inner tubular member adjacent the said sealed ends, means to supply a pressure of air to the space between said concentric tubular members, means to permit a portion of said air to enter the inner said tubular member adjacent the closed end thereof, a closure member for the open end of the outer tubular member, an opening in said closure member in alignment with the axis of the inner tubular member, and means defining an axially located radiation tunnel of determined cross-section along the length of said inner tubular member to conduct radiation passing through said opening to said radiation sensitive device in a substantially straight line path.

LOUIS OSCAR SORDAHL.